3,351,586
POLY-6(AMINO-ACYL-AMINO)PENICILLANIC ACIDS AND METHOD OF PREPARATION
Norman H. Grant, Wynnewood, Donald E. Clark, Norristown, and Harvey E. Alburn, West Chester, Pa., assignors to American Home Products Corporation, New York, N.Y., a corporation of Delaware
No Drawing. Filed Aug. 13, 1965, Ser. No. 479,641
8 Claims. (Cl. 260—239.1)

This invention relates to new synthetic penicillins having anti-microbial activity, and to a method of preparing said penicillins.

In co-pending U.S. application Ser. No. 256,816, of Harvey E. Alburn, Norman H. Grant and Horace Fletcher, 3rd, filed Feb. 7, 1963, now Patent No. 3,206,455, as a continuation-in-part of U.S. application Ser. No. 175,828, filed Feb. 6, 1962, and now abandoned; there is disclosed and claimed a novel method for preparing various penicillanic acids, including those disclosed in U.S.P. 2,985,648, which penicillanic acids come within the more comprehensive general formula:

I 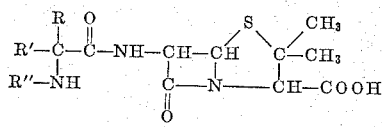

wherein R, R' and R'' each may represent a number selected from the group consisting of hydrogen, aryl, aralkyl, saturated alkyl, unsaturated alkyl, cycloalkyl, and heterocyclic radicals; R and R' may be joined to form a hydrocarbon ring; and R' and R'' may be joined to form a heterocyclic ring. As disclosed in said co-pending patent application Ser. No. 256,816; R, R' and R'', when separate radicals or forming a ring as defined, may carry substituents such as those disclosed for aryl in said patent application and in U.S.P. 2,985,648 referred to in said application. Thus, the various penicillanic acid derivatives coming within the above Formula I, may be prepared by the method disclosed in said U.S. application Ser. No. 256,816, or, in many instances, by the method described in said U.S.P. 2,985,648. Regardless of the method chosen, whether it is selected from those referred to herein, or by other methods known to the art; the penicillanic acids derivatives obtained thereby, are not known to have been produced in any other form than the monomeric. It is, of course, recognized that, in the well known formation of certain non-toxic salts of various penicillins; dimers, and the like, have been produced.

We have now discovered that penicillins of Formula I above, may be transformed into polymeric types, wherein the basic molecular configuration of the original penicillin repeats itself in a polymer chain, with significant structural modification only in the β-lactam-nucleus. These new penicillins may be represented by the following general formula:

II 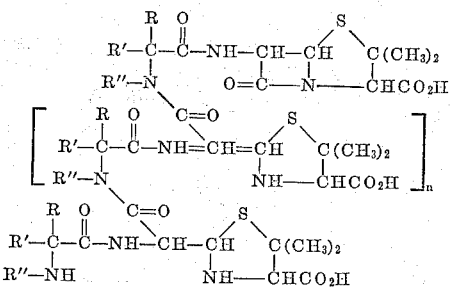

wherein R, R' and R'' have the same meaning as in Formula I above, and in which n is an integer from 0 to about 100.

The novel compounds of Formula II have been found to exhibit antibacterial activity and hence to be useful as therapeutic agents in the treatment of infectious diseases. For such purpose, they may be administered either parenterally or orally in manner and regimen now well known in the penicillin art.

The poly-6(α-amino-acyl-amino)penicillanic acids coming within the above Formula II may be prepared conveniently from their precursors of Formula I generally by preparing suspensions or solutions of the selected precursors in water; where necessary, adjusting the pH to the intermediate range of from about pH 6.0 to about pH 9.0 by addition of an inorganic base; then storing the resulting solution at substantially room temperature for at least three (3) days; and thereafter either concentrating the aqueous solution or precipitating with organic solvent to obtain the crystalline polymer.

The following examples are given by way of illustration only and are not to be construed as limitative of the invention, many variations of which are possible without departing from the scope and spirit thereof, as will readily appear to those skilled in the art.

EXAMPLE I

Poly-6-(D-2-amino-2-phenylacetamido)penicillanic acid

A suspension containing 3.85 grams of ampicillin and 20 ml. of water was neutralized to pH 7.5 by the addition of 0.9 ml. of 10 N KOH. The solute was now totally dissolved. Ten ml. of the solution was stored for 11 days at 22°, during which it was periodically assayed. The pH fell to 6.7. The solution was then lyophilized, giving 1.7 g. of product. The average molecular weight was found to be 750–900 by osmometry, 1211 by hydroxyl-amine end-group analysis, and 931 by a combination of iodimetry and hydroxylamine assay. Relative to ampicillin, the hydroxylamine reactivity (measuring β-lactam) was 30% and the ninhydrin reactivity was 59%. Electrometric titration showed $pK_2=4.4$ and $pK_3=7.5$.

EXAMPLE II

Poly-6-(D-2-amino-2-phenylacetamido)penicillanic acid

To 10 ml. of the original pH 7.5 solution of Example I was added 0.5 ml. of pyridine, and the solution was stored for 11 days at 22°. A precipitate formed and was removed by filtration. The filtrate lyophilized, giving 1.1 g. of polymer. The average molecular weight was found to be 1210–1480 by osmometry and 1396 by hydroxylamine end-group analysis. Relative to ampicillin, the hydroxylamine reactivity was 24% and the ninhydrin reactivity was 49%. Electrometric titration showed $pK_2=4.7$ and $pK_3=7.5$.

EXAMPLE III

Poly-6-(L-2-amino-2-phenylacetamido)penicillanic acid

Ten ml. of saturated solution of L-α-aminobenzylpenicillin (86 mg./ml. at 24°, pH 7.5) was stored for varying periods and analyzed. As tabulated, decreases in ninhydrin reactivity accompanying decreases in hydroxylamine reactivity show formation of the penicillin polymer.

| Days | Change in property | |
|---|---|---|
| | Ninhydrin, percent | Hydroxamate, percent |
| 7 | −47 | −68 |
| 14 | −55 | −72 |
| 50 | −59 | −82 |

EXAMPLE IV

*Poly-6-(α-aminoacetamido)penicillanic acid*

A 50% solution of 6-(α-aminoacetamido) penicillanic acid in 2 ml. of water was prepared. The polymer formed on standing at room temperature, as shown by the following changes in ninhydrin response and capacity to form the hydroxamic acid.

| Days | Change in property | |
|---|---|---|
| | Ninhydrin, percent | Hydroxamate, percent |
| 3 | −30 | −70 |
| | −49 | −82 |

EXAMPLE V

*Poly-6-(1-aminocyclopentanecarboxamido)penicillanic acid*

A 50% solution of 6-(1-aminocyclopentanecarboxamido)penicillanic acid in one ml. of water was prepared. The polymer formed on standing at room temperature, as shown by the following changes in ninhydrin response and capacity to form the hydroxamic acid.

| Days | Change in property | |
|---|---|---|
| | Ninhydrin, percent | Hydroxamate, percent |
| 3 | −27 | −73 |
| 7 | −42 | −76 |

We claim:

1. A poly-6(α-amino-acyl-amino)penicillanic acid of the formula:

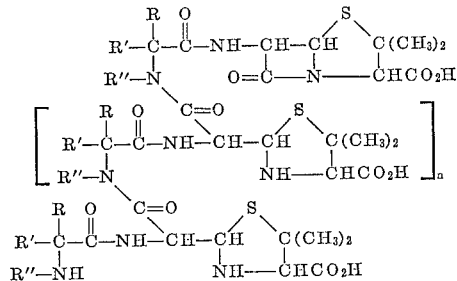

wherein R, when taken alone is hydrogen, R' is a member of the group consisting of hydrogen, lower alkyl and phenyl, R" is hydrogen, R and R', when joined together, complete a ring which is lower cycloalkyl having up to five carbon atoms, and $n$ is an integer from 0 to about 100.

2. Poly-6-(D-2-amino-2-phenylacetamido)penicillanic acid having an average molecular weight of from about 750 to about 1500.

3. Poly-6-(L-2-amino-2-phenylacetamido)penicillanic acid having an average molecular weight of from about 750 to about 1500.

4. Poly-6-(α-aminoacetamido)penicillanic acid having a ninhydrin response of about −49 percent and a hydroxamate reactivity of about −82 percent.

5. Poly-6-(1-aminocyclopentanecarboxamido)penicillanic acid having a ninhydrin response of about −42 percent and a hydroxamate reactivity of about −76 percent.

6. A method for preparing a poly-6(α-amino-acyl-amino)penicillanic acid of the formula:

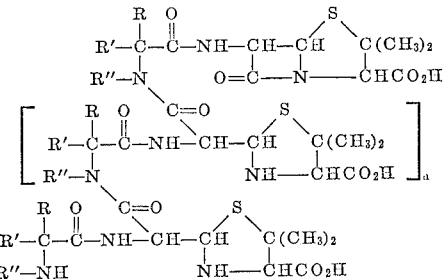

wherein R, when taken alone is hydrogen, R' is a member of the group consisting of hydrogen, lower alkyl and phenyl, R" is hydrogen, R and R', when joined together, complete a ring which is lower cycloalkyl having up to about five carbon atoms, and $n$ is an integer from 0 to about 100, which method comprises:

(A) preparing an aqueous mixture of a penicillin of the formula:

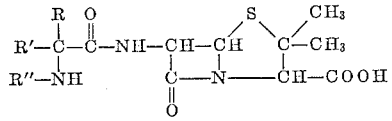

wherein R, R' and R" have the same meaning as above;

(B) maintaining the mixture at a pH from about 6.0 to about 9.0 and at substantially room temperature for at least three (3) days; and (C) thereafter isolating the resulting polymer from the mixture as a crystalline product, by a procedure selected from the group consisting of (a) concentrating the aqueous solution, when formed, down to the crystalline product, or (b) removing from the suspension of the crystalline product, when formed, said crystalline product.

7. A method for preparing a poly-6(α-amino-acyl-amino)penicillanic acid as claimed in claim 6, wherein in (A), the aqueous mixture is a suspension of ampicillin; in (B), the mixture is adjusted to the specified pH range and changed to a solution by addition of a basic inorganic compound; and in (C), the resulting aqueous solution is lyophilized down to the crystalline polymer product.

8. A method for preparing a poly-6(α-amino-acyl-amino)penicillanic acid as claimed in claim 6, wherein in (A), and (B), the aqueous mixture is a solution in water of a compound of the group consisting of 6-(α-aminoacetamido)penicillanic acid and 6-(1-aminocyclopentanecarboxamido)penicillanic acid; and in (C), the resulting suspension has the crystalline product formed therein, removed therefrom.

References Cited

UNITED STATES PATENTS 3,316,273    4/1967    Gottstein _____ 260—239.1

NICHOLAS S. RIZZO, *Primary Examiner.*

UNITED STATES PATENT OFFICE
CERTIFICATE OF CORRECTION

Patent No. 3,351,586                  November 7, 1967

Norman H. Grant et al.

It is hereby certified that error appears in the above numbered patent requiring correction and that the said Letters Patent should read as corrected below.

Column 1, line 28, for "number" read -- member --; same column 1, lines 58 to 69, for that portion of the formula reading

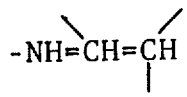        read        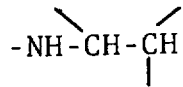

Signed and sealed this 11th day of March 1969.

(SEAL)
Attest:

Edward M. Fletcher, Jr.
Attesting Officer

EDWARD J. BRENNER
Commissioner of Patents